Patented Aug. 17, 1926.

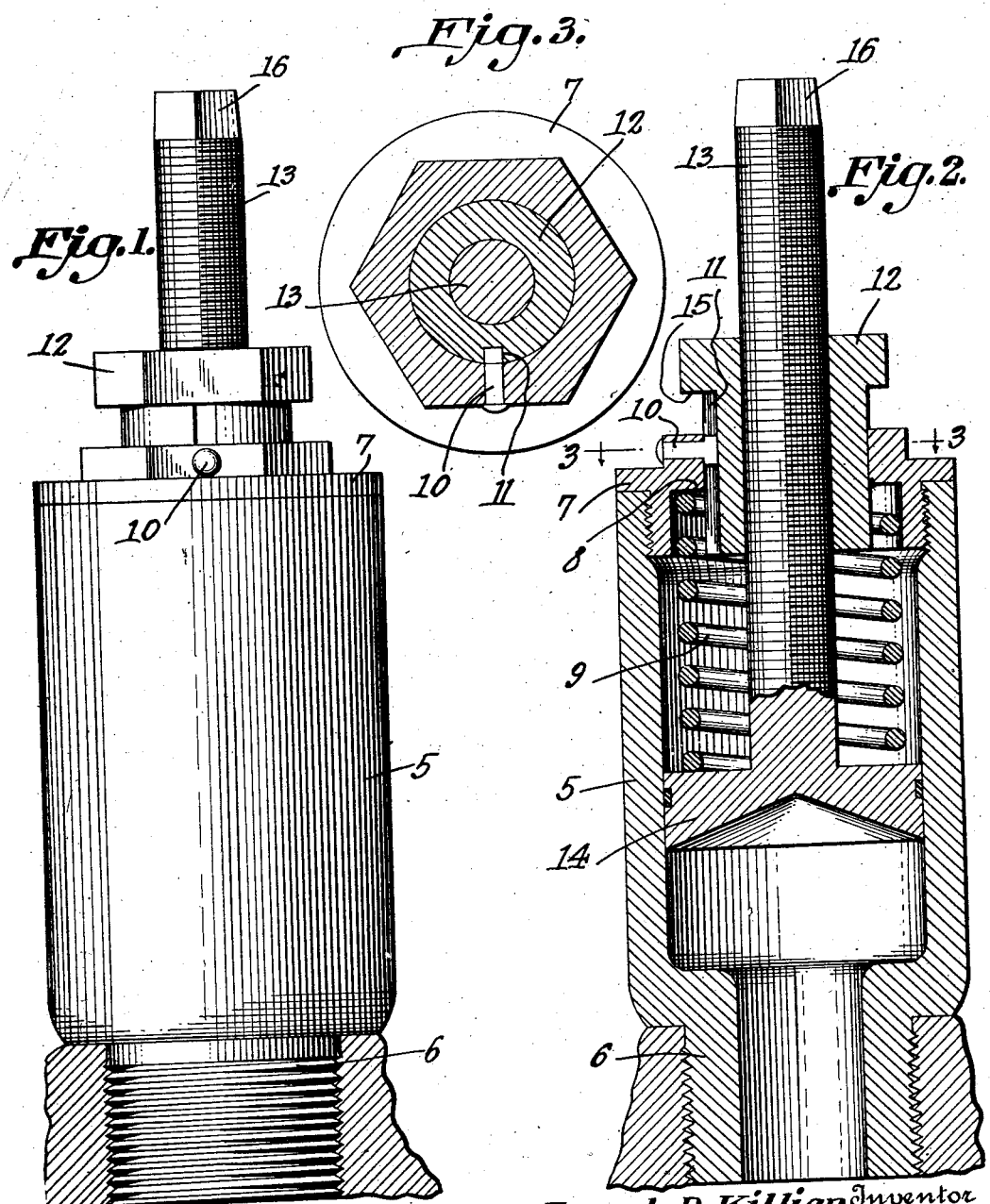

1,596,359

UNITED STATES PATENT OFFICE.

JOSEPH D. KILLIAN, OF CHEYENNE, WYOMING.

GREASE CUP.

Application filed August 26, 1925. Serial No. 52,643.

This invention relates to grease cups especially designed for use in connection with locomotive or heavy duty engines, the primary object of the invention being to provide a grease cup wherein the pressure on the plunger forming a part thereof will be automatically relieved after a predetermined quantity of grease has been ejected from the grease cup.

Another important object of the invention is to provide a grease cup having means for automatically forcing the grease therefrom to insure lubrication of the elements to which the same is connected.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a grease cup constructed in accordance with the present invention.

Figure 2 is a longitudinal sectional view therethrough.

Figure 3 is a transverse sectional view taken on line 3—3 of Figure 2.

Referring to the drawing in detail, the reference character 5 designates the body portion of the cup which is provided with a reduced end portion 6 that is threaded so that the same may be readily and easily positioned in the usual threaded grease cup opening common in the construction of machinery.

The upper extremity of the body portion 5 is supplied with internal threads to accommodate the threads of the cap 7 which cap is constructed to define an internal shoulder 8 providing an abutment for one end of the coiled spring 9 to be hereinafter more fully described.

The cap 7 is also supplied with a central opening to which the plunger shank and regulating nut extend and as shown, a finger 10 is provided and secured within a suitable opening in the cap, which finger is adapted to move in the groove 11 of the regulating nut 12.

Internal threads are provided in the regulating nut 12, which threads cooperate with the threaded shank 13 of the plunger 14 so that the threaded shank and adjusting nut will move together, longitudinally of the body portion of the grease cup. The regulating nut 12 is provided with flat surfaces for the reception of a suitable wrench, and has a shoulder 15 adapted to be engaged by the finger 10 when the plunger shank and regulating nut have been moved a predetermined distance.

The lower end of the coiled spring 9 rests on the upper surface of the plunger 14 and normally exerts a pressure thereon, which pressure acts to automatically feed the plunger longitudinally of the body portion of the grease cup to force grease therefrom.

At the upper end of the shank 13 is a squared portion 16 for the reception of a suitable wrench whereby the shank may be rotated to feed the plunger shank and plunger to the limit of its upward movement. When the grease cup is to be filled, the plunger is moved to the limit of its outward movement, which places the spring 9 under tension. The cap is now removed and grease is packed in the body portion 5.

The plunger shank is now rotated, and due to the fact that the grease cup is filled with grease, the regulating nut 12 moves outwardly a predetermined distance, according to the amount of grease to be forced from the grease cup. With the regulating nut 12 set, as the grease in the cup becomes warm due to friction, the plunger under the action of the spring 9 will feed longitudinally of the grease cup until the shoulder 15 of the regulating nut 12 contacts with the finger 10.

Pressure on the plunger is now relieved and the grease in the grease cup ceases to flow, until a further adjustment has been made

I claim:—

In a grease cup, a body portion, a removable cap for closing one end of the body portion, said cap having a central opening, a finger extending inwardly from the cap, a nut slidable through the opening in the cap and having a groove to receive the finger to prevent rotation of the nut, said nut having internal threads, a plunger having a threaded shank operating within the threaded nut, means engaging the plunger and cap for normally urging the plunger longitudinally of the grease cup, and said nut having a shoulder adapted to engage the cap to restrict movement of the plunger.

In testimony that I claim the foregoing as my own, I have hereto affixed my signature.

JOSEPH D. KILLIAN.